(12) United States Patent
Bianciotto et al.

(10) Patent No.: US 11,296,796 B2
(45) Date of Patent: *Apr. 5, 2022

(54) DUAL PARALLEL MACH-ZEHNDER-MODULATOR DEVICE WITH PRE-DISTORTED DRIVING VOLTAGES

(71) Applicant: Xieon Networks S.à.r.l., Luxembourg (LU)

(72) Inventors: Alessandro Bianciotto, Gottingen (DE); Stefano Calabró, Munich (DE); Maxim Kuschnerov, Munich (DE); Mahdi Mezghanni, Munich (DE); Antonio Napoli, Munich (DE); Bernhard Spinnler, Oberhaching (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,147

(22) Filed: Feb. 26, 2019

(65) Prior Publication Data

US 2019/0199442 A1 Jun. 27, 2019

Related U.S. Application Data

(63) Continuation of application No. 15/119,072, filed as application No. PCT/EP2015/055158 on Mar. 12, 2015, now Pat. No. 10,263,708.

(30) Foreign Application Priority Data

Mar. 19, 2014 (EP) .................................... 14160693

(51) Int. Cl.
*H04B 10/588* (2013.01)
*H04B 10/50* (2013.01)
(Continued)

(52) U.S. Cl.
CPC ......... *H04B 10/588* (2013.01); *G02F 1/2255* (2013.01); *H04B 10/0795* (2013.01);
(Continued)

(58) Field of Classification Search
CPC .. H04B 10/588; H04B 10/61; H04B 10/0795; H04B 10/5053; H04B 10/5055; G02F 1/2255; G02F 2001/212
See application file for complete search history.

(56) References Cited

U.S. PATENT DOCUMENTS

| 5,850,305 A | 12/1998 | Pidgeon |
|---|---|---|
| 9,124,364 B1 | 9/2015 | Sotoodeh et al. |

(Continued)

OTHER PUBLICATIONS

Cho, P.S. et al., "Closed-Loop Bias Control of Optical Quadrature Modulator," IEEE Photonics Technology Letters, vol. 18(21): 2209-2211 (2006).
(Continued)

*Primary Examiner* — Leslie C Pascal

(57) ABSTRACT

Disclosed herein is a dual parallel Mach-Zehnder-modulator (DPMZM) device comprising a DPMZM 10 having first and second inner MZMs arranged parallel to each other. The first inner MZM generates an in-phase component $E_I$ of an optical signal in response to a first driving voltage $V_I$, and the second inner MZM generates a quadrature component $E_Q$ of said optical signal in response to a second driving voltage $V_Q$. Further disclosed is a calculation unit 52 configured for receiving an in-phase component $y_I$ and a quadrature component $y_Q$ of a desired base-band signal, and for calculating pre-distorted first and second driving voltages $V_I$, $V_Q$. The calculation of the pre-distorted first and second driving voltages $V_I$, $V_Q$ is based on a model of said DPMZM 10 accounting for I-Q cross-talk, and using an algorithm that (Continued)

Figure 1:
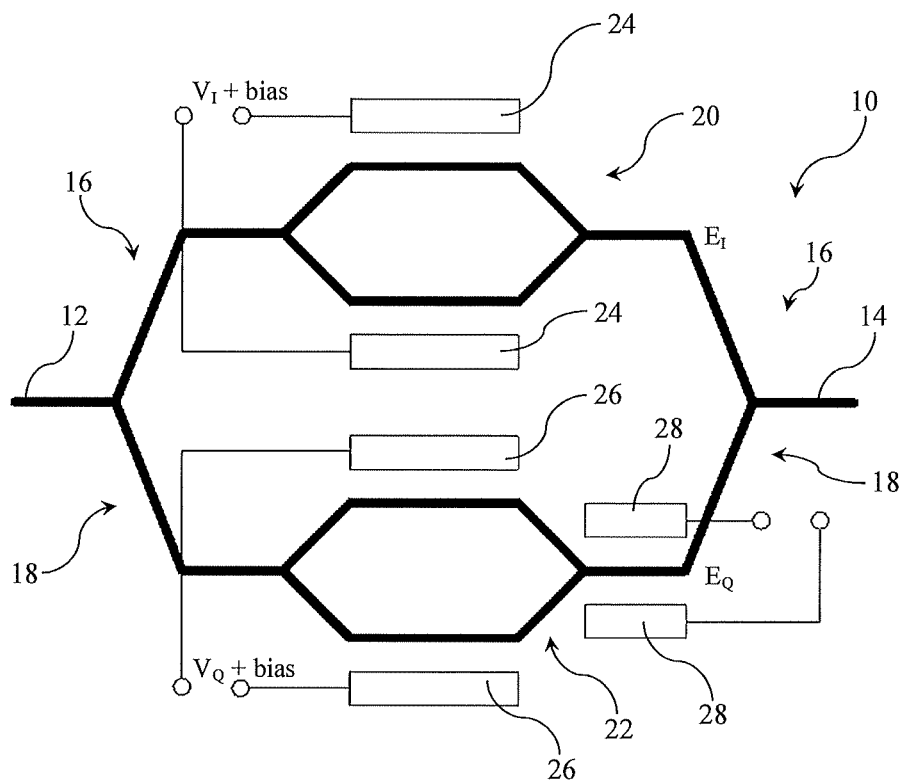

determines said first and second driving voltages $V_I$, $V_Q$ each as a function of both of said in-phase and quadrature components $y_I$, $y_Q$ of said base-band signal.

35 Claims, 9 Drawing Sheets

(51) Int. Cl.
| | | |
|---|---|---|
| *H04B 10/079* | (2013.01) | |
| *H04B 10/61* | (2013.01) | |
| *G02F 1/225* | (2006.01) | |
| *G02F 1/21* | (2006.01) | |

(52) U.S. Cl.
CPC ..... *H04B 10/5053* (2013.01); *H04B 10/5055* (2013.01); *H04B 10/61* (2013.01); *G02F 2001/212* (2013.01)

(56) References Cited

U.S. PATENT DOCUMENTS

| | | | |
|---|---|---|---|
| 10,263,708 B2 * | 4/2019 | Bianciotto | H04B 10/5053 |
| 2004/0197103 A1 | 10/2004 | Roberts et al. | |
| 2014/0233965 A1 | 8/2014 | Kim et al. | |
| 2015/0236790 A1 | 8/2015 | Guo et al. | |
| 2017/0054511 A1 | 2/2017 | Bianciotto et al. | |

OTHER PUBLICATIONS

International Preliminary Report on Patentability, PCT/EP2015/055158, dated Sep. 20, 2016, 7 pages.

International Search Report and Written Opinion, PCT/EP2015/055158, dated May 15, 2015, 12 pages.

Jiang, Y. et al., "Electronic Pre-Compensation of Narrow Optical Filtering for OOK, DPSK and DQPSK Modulation Formats," A Journal of Lightwave Technology, IEEE Service Center, New York, NY. vol. 27(16): 3689-3698 (2009).

Killey, R. "Dispersion and Nonlinearity Compensation Using Electronic Predistortion Techniques," The IEE Seminar on Optical Fibre Communications and Electronic Signal Processing: Dec. 15, 2005, The IEE, London, UK, London: IEE, GB, pp. 211-216 (2005).

Kuschnerov, M. et al., "Advances in Signal Processing," ECOC Technical Digest, Optical Society of America, We.2.A.1 3 pages (2012).

Masella, B. et al., "Enhanced Spurious-Free Dynamic Range Using Mixed Polarization in Optical Single Sideband Macha Zehnder Modulator," Journal of Lightwave Technololgy, IEEE Service Center, New York, NY, US, vol. 27(15): 3034-3041 (2009).

Sotoodeh, M. et al., "Modulator Bias and Optical Power Control of Optical Complex E-Field Modulators," Journal of Lightwave Technology, vol. 29(15): 2235-2248 (2011).

Vujicic, V. et al., "Predistortion Technique for Mitigating the Mach-Zehnder Modulator Nonlinearity Effect in DD-DFDM-UWB Optical Transmission Systems," ICTON 2011 (TuA5.5) IEEE 4 pages (2011).

Yamazaki, E. et al., "Digital Compensation of Intercarrier Nonlinear Distortion With Carrier Phase Locking," Journal of Lightwave Technology, IEEE Service Center, New York , NY, US, vol. 28(5):828-836 (2010).

* cited by examiner

DUAL PARALLEL MACH-ZEHNDER-MODULATOR DEVICE WITH PRE-DISTORTED DRIVING VOLTAGES

CROSS REFERENCE TO RELATED APPLICATIONS

The present application a continuation application of U.S. patent application Ser. No. 15/119,072, filed Aug. 15, 2016, which is a 35 U.S.C. 371 national stage filing of International Application No. PCT/EP2015/055158, filed on Mar. 12, 2015, which claims priority to European Patent Application No. 14160693.9 filed on Mar. 19, 2014. The contents of the aforementioned applications are hereby incorporated by reference in their entireties.

FIELD OF THE INVENTION

The present invention is in the field of optical data transport technology. More particularly, the present invention relates to a dual parallel Mach-Zehnder-modulator (DPMZM) device for modulating the amplitude and phase of a laser carrier according to data to be transmitted, as well as a method for operating a DPMZM.

BACKGROUND OF THE INVENTION

The structure of a conventional DPMZM 10 is shown in FIG. 1. As seen therein, the DPMZM 10 comprises an optical input 12 for inputting an optical carrier signal, and an optical output 14 for outputting a QAM-modulated optical signal. Downstream of the optical input 12, the DPMZM 10 branches into a first and a second arm 16, 18, respectively, that are rejoined at the optical output 14, thereby forming what is referred to as an "outer MZM" in the present disclosure.

Within each of the first and second arms 16, 18 of the outer MZM, respective first and second "inner" MZMs 20, 22 are provided. The first inner MZM 20 comprises electrodes 24 for applying a first driving voltage $V_I$ for generating an in-phase component $E_I$ of the optical signal to be transmitted. In other words, the first driving voltage $V_I$ is intended for modulating the part of the carrier signal propagating along first arm 16 of the outer MZM according to the I-component of a base-band signal, and said driving voltage $V_I$ is hence generally an AC-signal. In addition to AC-driving, a bias voltage is applied to the first inner MZM 20. While in practical implementations AC-driving and bias would typically be applied using different electrodes, for simplicity a single set of electrodes 24 is shown in FIG. 1.

Likewise, a pair of electrodes 26 is associated with the second inner MZM 22, for applying a second driving voltage $V_Q$ for generating a quadrature component $E_Q$ of the optical signal and for also applying a suitable bias voltage. Finally, a set of electrodes 28 is provided in the second arm 18 of the outer MZM in order to introduce a desired phase shift of 90° between the in-phase and quadrature components $E_I$ and $E_Q$ of the modulated signal before these I- and Q-modulated signals are combined at the optical output 14.

The amplitudes $E_1$ and $E_2$ of the electrical fields of the portions of the carrier entering the first and second arms 16, 18 of the outer MZM can be modulated in response to the driving voltages $V_I$, $V_Q$ to give the in-phase and quadrature components $E_I$, $E_Q$ as follows:

$$E_I = \sin\left(\frac{\pi}{2} \cdot \frac{V_I}{V_\pi} + \varphi_1\right) E_1 \qquad (1)$$

$$E_Q = \sin\left(\frac{\pi}{2} \cdot \frac{V_Q}{V_\pi} + \varphi_2\right) E_2,$$

assuming that the DPMZM device is composed of ideal inner and outer MZMs. As seen herein, the in-phase and quadrature components $E_I$, $E_Q$ depend non-linearly from the corresponding driving voltages $V_I$, $V_Q$. $V_\pi$ is a device dependent constant and $\varphi_1$ and $\varphi_2$ are constant phases which can be adjusted by introducing a suitable bias at the electrodes 24, 26, respectively.

Unfortunately, a DPMZM is far from an ideal device: By its construction principle, it has non-linear input-output characteristics, and due to manufacturing imperfections, it generates cross-talk and amplitude imbalance between in-phase and quadrature components of the output signal. It is seen that the manufacturing imperfections are related to the extinction ratio (ER) of the DPMZM, i.e. the ratio of the maximum and minimum output power at the optical output 14 of the outer MZM over a sweep of the first and second driving voltages $V_I$, $V_Q$. An ideal DPMZM has an infinite ER, but series manufactured MZMs rarely achieve a guaranteed ER greater than 20 dB. With the introduction of new technologies like CMOS Photonics, it can be envisaged that newer and cheaper DPMZMs will become available, but their extinction ratios will likely be even well below 20 dB.

The non-ideal characteristics of the DPMZM impair the quality of the transmit signal and result into a performance penalty depending on the adopted signal constellation. State-of-the-art 100 G (~100 GB/s) optical systems employ 4-point quadrature amplitude modulation (4 QAM) which tolerates well the imperfections of currently available DPMZMs. However, 200 G and 400 G systems will likely rely on 16 QAM that is very sensitive to DPMZM limitations. Future systems may also employ bigger QAM constellations or orthogonal frequency division multiplexing (OFDM) which suffer from even larger penalties. It would therefore seem that for these applications, an increased manufacturing effort is unavoidable in order to achieve the required signal quality.

SUMMARY OF THE INVENTION

The problem underlying the invention is to provide a DPMZM device that allows for an improved signal quality with minimum increase in manufacturing effort.

This problem is solved by each of a DPMZM device and a modulation method according to claims the present invention.

Similar to the prior art DPMZM of FIG. 1, the DPMZM device of the invention comprises first and second inner MZMs arranged parallel to each other, the first inner MZM for generating an in-phase component $E_I$ of an optical signal in response to a first driving voltage $V_I$ and the second inner MZM for generating a quadrature component $E_Q$ of said optical signal in response to a second driving voltage $V_Q$. In addition, the DPMZM device of the invention comprises a calculation unit configured for receiving an in-phase component $y_I$ and a quadrature component $y_Q$ of a desired base-band signal, and calculating pre-distorted first and second driving voltages $V_I$, $V_Q$ based on a model of said DPMZM device accounting for I-Q cross-talk, and using an algorithm that determines said first and second driving voltages each as a function of both of said in-phase and quadrature components $y_I$, $y_Q$ of said desired base-band signal.

Note that in the present disclosure, the term "DPMZM" refers to the optical component only, while the term "DPMZM device" in addition includes electronic components, such as the calculation unit. For example, the DPMZM may be part of an optical chip, and the calculation unit may be formed by a further electronic chip. However, the present invention is not limited to any specific structure in this regard. For example, the optical and electronic components could also be integrated on a single chip. Further, the "calculation unit" need of course not be a separate entity but could be resembled by an electronic component implementing further functionalities, other than the pre-distortion such as for example electrical functionalities of a transmitter.

Instead of trying to avoid imperfect optical behavior of the DPMZM at any price, the present invention simply put suggests to take the deficiencies as they are but to instead mitigate the adverse effects of these deficiencies by a new way of calculating first and second driving voltages $V_I$, $V_Q$ accounting for these deficiencies. The invention is based on the observation that a main source of the errors encountered is due to the finite inner extinction ratios of the individual first and second inner MZMs, which turn out to be the major source of cross-talk between the in-phase and quadrature output components $E_I$ and $E_Q$. Accordingly, the present invention suggests to calculate the first and second driving voltages $V_I$, $V_Q$ based on a model of the DPMZM accounting for I-Q cross-talk.

Further, according to the invention the calculating unit uses an algorithm that determines the first and second driving voltages $V_I$, $V_Q$ each as a function of both of said in-phase and quadrature components $y_I$, $y_Q$ of the desired base-band signal. Namely, since due to the finite inner extinction ratios cross-talk as such cannot be avoided, in the framework of the invention the first and second driving voltages $V_I$, $V_Q$ can be calculated in an anticipatory view of the prospective cross-talk, thereby leading to adapted or "pre-distorted" first and second driving voltages $V_I$, $V_Q$ that will lead to the desired in-phase and quadrature components $y_I$, $y_Q$. The term "pre-distortion" hereby indicates that the driving voltages are "distorted" as compared to the driving voltages occurring in the ideal situation of Eq. (1), and they are "pre"-distorted in the sense that the distortion accounts for the imperfections of the inner MZMs and in particular the I-Q cross-talk in advance. This becomes possible if each one of the first and second driving voltages $V_I$, $V_Q$ are determined as a function of both of said in-phase and quadrature-components $y_I$, $y_Q$ of said base-band signal.

In a preferred embodiment, the model employed by the calculation unit is based on one or more model parameters corresponding to or at least partially reflecting the finite inner extinction ratios of the inner MZMs. In fact, as will be demonstrated below, the calculation unit may employ a model of the DPMZM in which the finite inner extinction ratios are explicitly employed as model parameters, and it turns out to be possible to greatly increase the signal quality by pre-distortion of the driving voltages $V_I$, $V_Q$ based on this model. However, the model may also be based on model parameters that only reflect, at least in part, the finite inner extinction ratio, for example by being functionally dependent on the inner extinction ratios.

The one or more model parameters can be determined upon manufacturing and may be stored in a memory of or accessible by the calculation unit. However, in a preferred embodiment, the DPMZM device comprises a parameter calculating unit which is adapted to
  receive a quality indicator fed-back from a receiver receiving the optical signal, and
  to modify the one or more model parameters such as to optimize the quality indicator.

This variant is based on the consideration that the better the model captures the imperfections of the DPMZM device, the more successfully can the quality impairments of the output signal be reduced by means of pre-distortion of the first and second driving voltages $V_I$, $V_Q$. Accordingly, an optimized quality indicator at the same time indicates that the one or more model parameters are optimally chosen. In a preferred embodiment, the quality indicator is an estimate of a bit-error-rate at the receiver and the parameter calculating unit is adapted to modify the one or more model parameters, in response to said back-fed bit-error-rate, such as to minimize the same. Alternatively, the quality indicator may be an estimate of the power of a residual carrier and the parameter calculating unit is adapted to modify the one or more model parameters, in response to the back-fed residual carrier power, such as to minimize the same.

A yet further example of a quality indicator is a deviation, in particular a mean square error between the desired transmit signals and the actual transmit signals, wherein the parameter calculating unit is adapted to modify the one or more model parameters such as to minimize said deviation.

In a preferred embodiment, the DPMZM device further comprises an AC-coupling for coupling said first and second driving voltages $V_I$, $V_Q$ as calculated by the calculation unit to the respective first and second inner MZMs. Further, first and second biasing units are associated with the first and second inner MZMs, respectively, said first and second biasing units being adapted to apply first and second bias components to said first and second inner MZMs. Herein, the first and second bias components may at least approximately represent corresponding DC-components of the driving voltages $V_I$, $V_Q$ as calculated by the calculation unit.

Note that generally, depending on the model of the DPMZM device employed by the calculation unit, it is not to be expected that the average values of the calculated pre-distorted first and second driving voltages $V_I$, $V_Q$ arising for all in-phase and quadrature components $y_I$, $y_Q$ of a desired base-band signal are zero, only because the average values of these components $y_I$, $y_Q$ themselves should be zero. Instead, as will be shown below with reference to an explicit embodiment, it is seen that the first and second driving voltages $V_I$, $V_Q$ arising from this calculation have a DC-component or "offset". However, when AC-coupling the first and second driving voltages $V_I$, $V_Q$ with the first and second inner MZMs, this DC-component would be lost. According to this embodiment, this lost DC-component is re-introduced by first and second biasing units associated with the first and second inner MZMs, respectively, which are adapted to apply first and second bias components to the first and second inner MZMs making up for the missing DC-components of the AC-coupled $V_I$, $V_Q$.

Herein, it is referred to first and second bias "components" because the first and second biasing units will in general provide a further bias as would occur in an ordinary bias control scheme, for example for compensating the phase offsets $\varphi_1$, $\varphi_2$ in Eq. (1), so that the bias corresponding to the DC-components of the calculated driving voltages $V_I$, $V_Q$ resembles only a component of the total bias applied to the first and second inner MZMs. Further, in practical applications, the bias corresponding to the respective DC-component of $V_I$ and $V_Q$ will not be applied separately, but together with the bias according to a customary control. But in this case too, the biases applied by the first and second biasing units do account for the DC-components of $V_I$ and $V_Q$ which would be lost due to AC coupling.

In one embodiment, the value of these first and second bias components could simply be obtained from the average of the calculated pre-distorted driving voltages $V_I$, $V_Q$. These computed bias components could then be added to the bias as determined by customary bias control In the alternative, however, the DPMZM device may further comprise a bias component control unit adapted to adjust the first and/or second bias components in response to

- an error indicating signal determined at a receiver receiving the optical signal, or
- a quality indicator, in particular a residual carrier in the optical signal, determined at a receiver of the optical signal.

Namely, if a DC-component of the pre-distorted first and second driving voltages $V_I$, $V_Q$ is truncated in the AC-coupling, this will lead to an increased signal error or a reduced quality of the signal at the receiver. By sending an error indicating signal or quality indicator determined at a receiver of the optical signal to the bias component control unit, the first and second bias components can be adjusted in a way that the error represented by the error indicating signal is reduced or the quality as indicated by the quality indicator is increased, which will then reintroduce at least approximately the bias that was lost due to truncation of the DC-component of the first and second driving voltages $V_I$, $V_Q$.

In a preferred embodiment, the bias component control unit is configured to adjust said first and second bias components using a gradient descent algorithm minimizing the error indicated by said error indicating signal or optimizing said quality indicator as a function of said first and/or second bias components.

According to the previous description, the parameter calculating unit and the bias component control unit rely on quality indicators or error indicating signals sent back to the DPMZM device from a receiver. Herein, the receiver may be a far-end receiver or a local monitoring receiver associated with the DPMZM device. In particular, the receiver may be a coherent receiver.

In a preferred embodiment, the aforementioned model of the DPMZM device employed by the calculation unit is based on the assumption that each of the first and second inner MZMs are independently biased to deliver the minimum possible output power when the first and second driving voltages $V_I$, $V_Q$, respectively, are zero. Note that this is generally not the biasing state which will lead to the optimum signal quality and might hence at first sight not be an obvious starting point for the model. However, it turns out that this model allows for a very simple and efficient calculation of the driving voltages $V_I$, $V_Q$ which then turn out to comprise a DC-component reflecting and in fact "repairing" the non-perfect biasing underlying this model. As explained before, these DC-components can then be accounted for by the bias component control unit in practical implementations.

In a preferred embodiment, the model employed by the calculation unit is represented by a system of two coupled non-linear equations relating the in-phase and quadrature components $y_I$, $y_Q$ of the desired base-band signal to the driving voltages $V_I$, $V_Q$.

In one embodiment, the system of two coupled linear equations can be represented as follows:

$$y_I = \sin\left(\frac{\pi}{2} \cdot \frac{V_I}{V_\pi}\right) + \gamma_Q \cdot \cos\left(\frac{\pi}{2} \cdot \frac{V_Q}{V_\pi}\right)$$

$$y_Q = \sin\left(\frac{\pi}{2} \cdot \frac{V_Q}{V_\pi}\right) - \gamma_I \cdot \cos\left(\frac{\pi}{2} \cdot \frac{V_I}{V_\pi}\right),$$

wherein $V_\pi$, $\gamma_I$ and $\gamma_Q$ are positive characterizing constants of the DPMZM device. More precisely, the constants $\gamma_I$, $\gamma_Q$ represent the square root of the inverse inner power extinction ratios of the first and second inner MZMs.

Note that the coupling of the two coupled non-linear equations is introduced by the terms proportional to $\gamma_Q$ and $\gamma_I$. A smaller inner extinction ratio corresponds to a larger value of $\gamma_I$ or $\gamma_Q$ and hence to an increased cross-talk. Conversely, if the inner extinction ratios approach infinity, the constants $\gamma_I$ and $\gamma_Q$ converge to zero, which means that the system of non-linear equations decouples and in fact converges towards the situation from Eq. (1).

Accordingly, the above system of two-coupled non-linear equations resembles a model of the DPMZM device accounting for first and second inner MZMs having finite inner extinction ratios and in fact directly employs two model parameters corresponding to the finite inner extinction ratios of the inner MZMs.

In a preferred embodiment, the aforementioned algorithm used by the calculation unit resembles an iterative solution of the coupled non-linear equation system. As will be shown in detail below with reference to a specific embodiment, the iterative solution can be provided with low computational effort in real time using look-up tables for only two non-linear functions requiring moderate memory. Herein, the iterative solution includes at least two, preferably at least three iterations.

In an alternative embodiment, the calculation performed by said calculation unit comprises solving the following equations:

$$V_I = \frac{2V_\pi}{\pi} \operatorname{asin}(P_1(y_I, y_Q))$$

$$V_Q = \frac{2V_\pi}{\pi} \operatorname{asin}(P_2(y_I, y_Q))$$

wherein $P_1(y_I, y_Q)$ and $P_2(y_I, y_Q)$ are polynomials of $y_I$ and $y_Q$. Herein, $P_1(y_I, y_Q)$ is preferably a first order polynomial in $y_I$ and a two or higher order polynomial in $y_Q$. Likewise, $P_2(y_I, y_Q)$ is preferably a first order polynomial in $y_Q$ and a two or higher order polynomial in $y_I$. The coefficients of the polynomials are examples of the aforementioned model parameters which can be determined by a parameter calculating unit in a way described above.

Preferably, the calculation unit comprises a look-up table for the function a sin(x), and preferably also a look-up table for the function cos(x) or cos(a sin(x)). Using for example a single look-up table for a sin(x), the above polynomial based expression for $V_I$, $V_Q$, can be evaluated. Using in addition a look-up table for cos(x) or cos(a sin(x)), the iterative solution of the above stated system of two coupled non-linear equations can be efficiently solved.

SHORT DESCRIPTION OF THE FIGURES

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device and method and such further applications of the principles of the invention as illustrated therein being contemplated therein as would normally occur now or in the future to one skilled in the art to which the invention relates.

Figure 2:
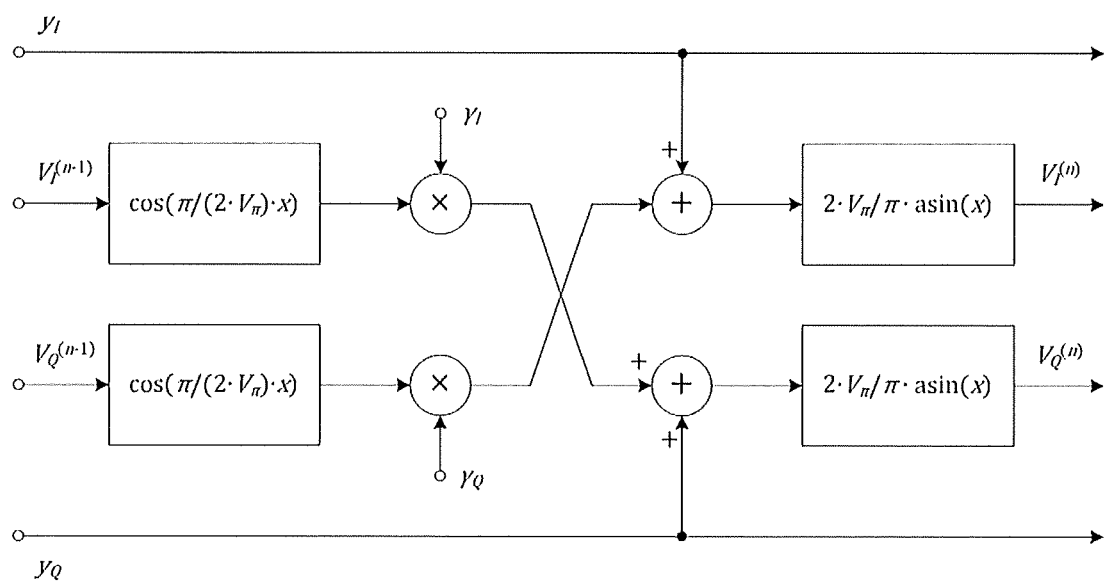
Figure 3:
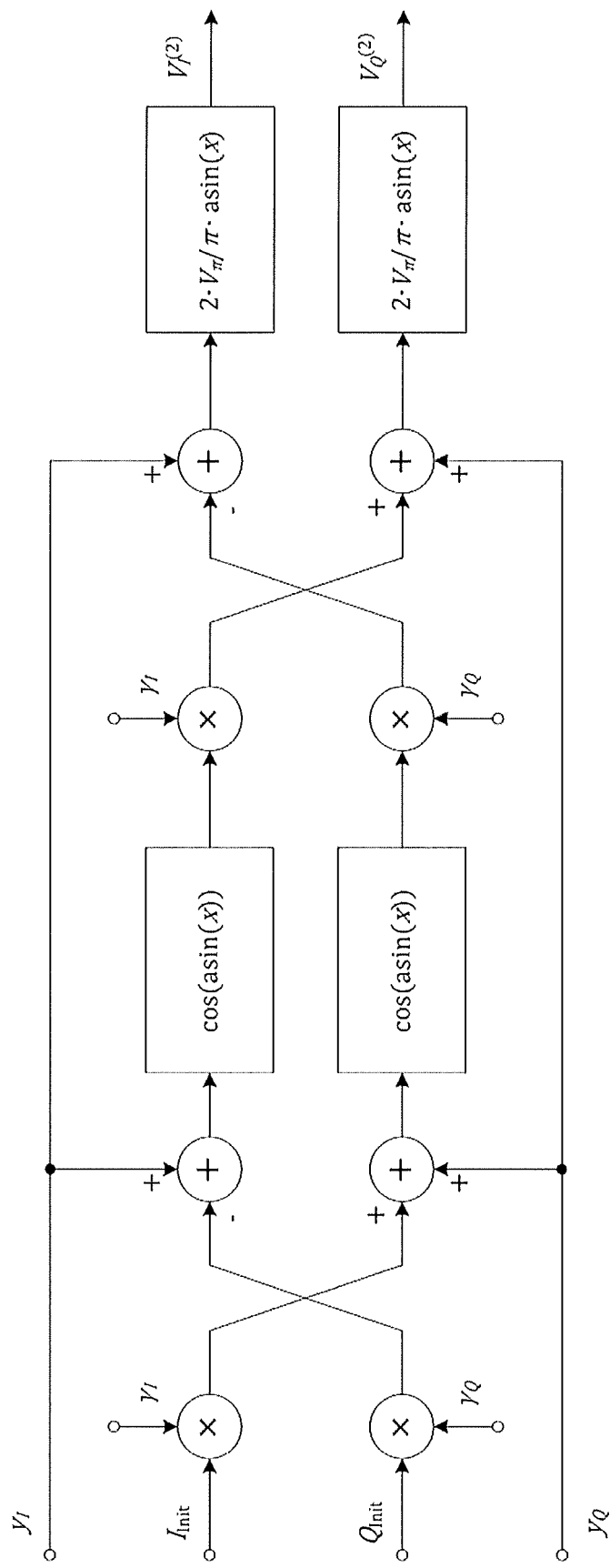
Figure 4:
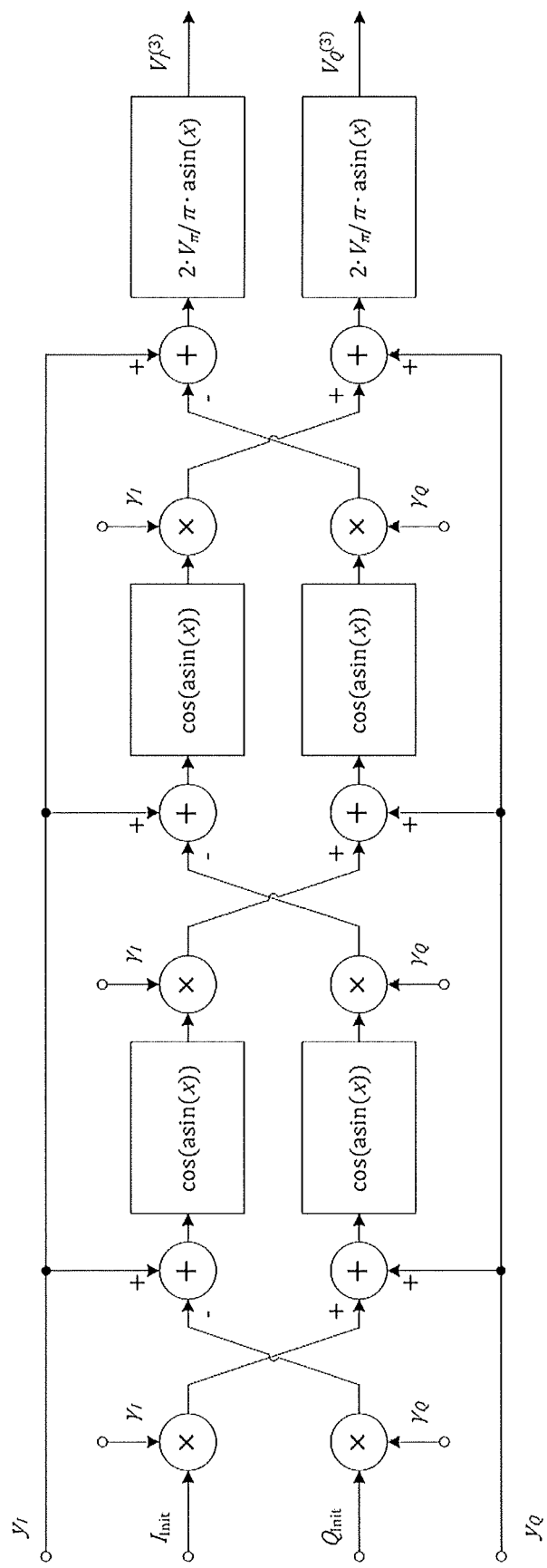
Figure 5:
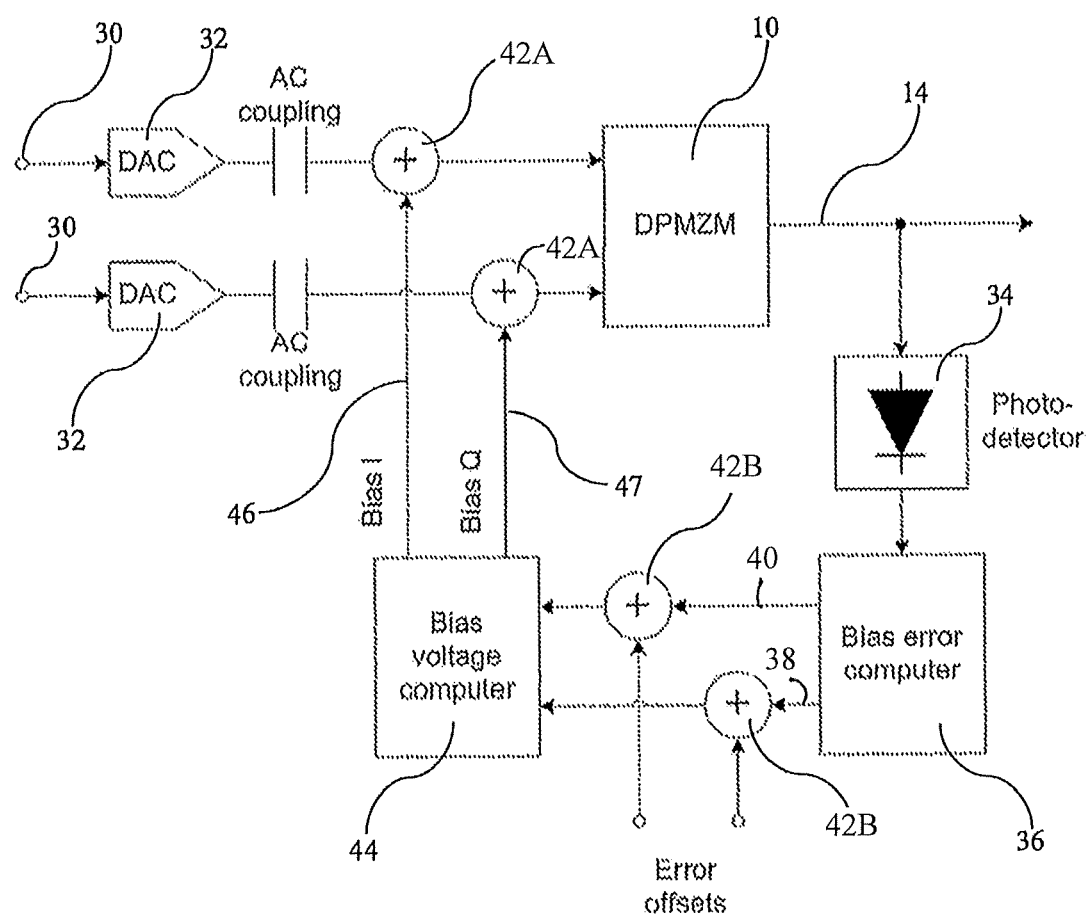
Figure 6:
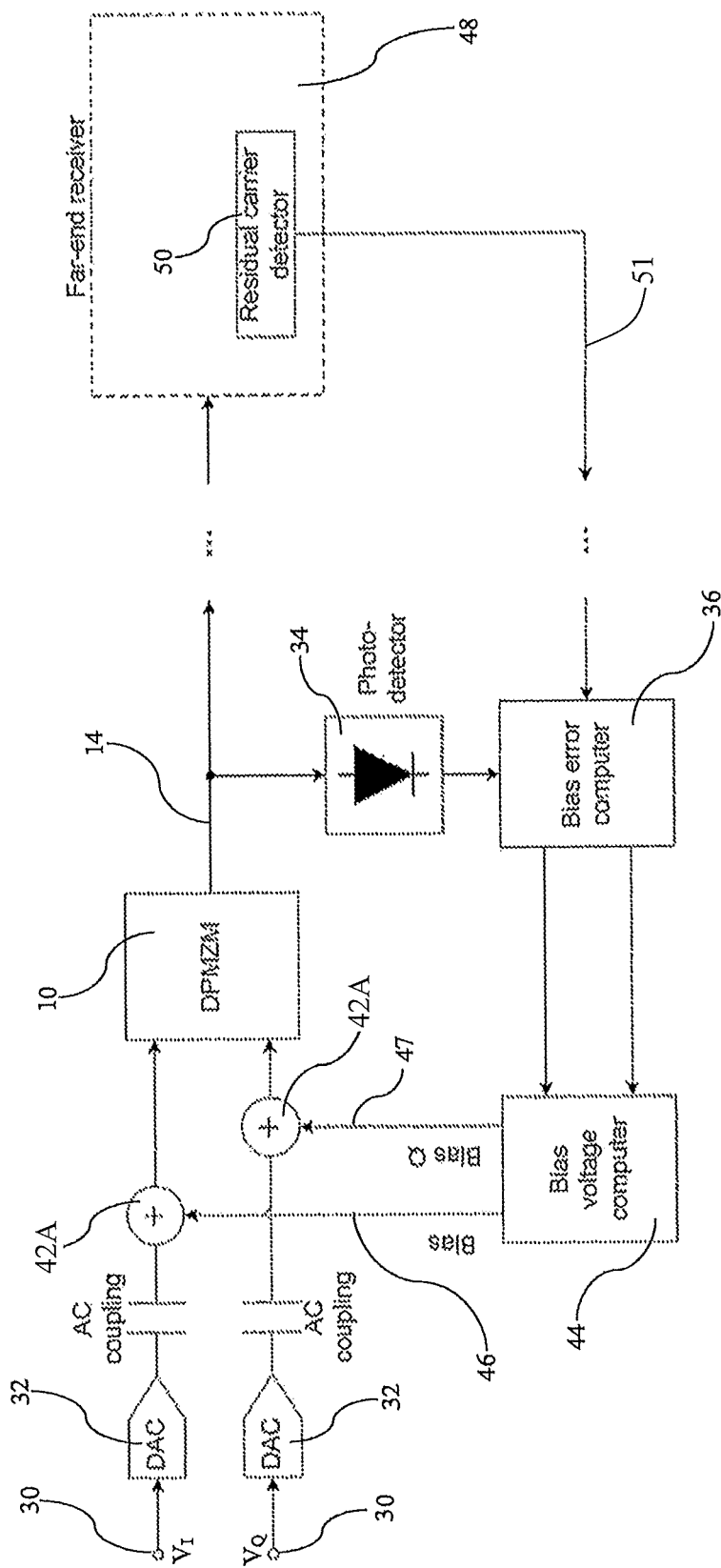
Figure 7:
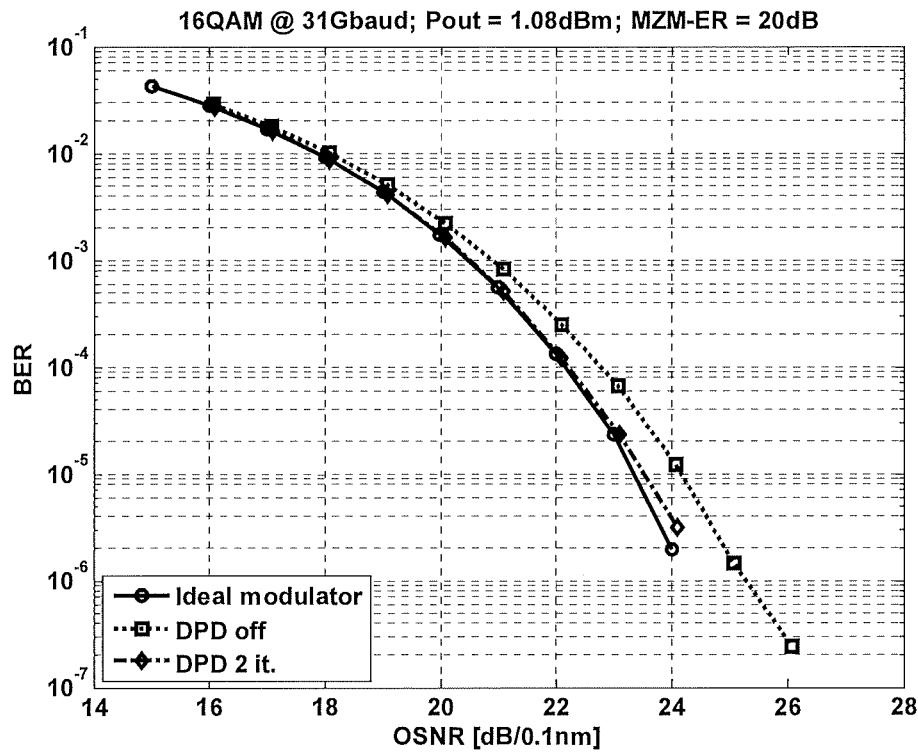
Figure 8:
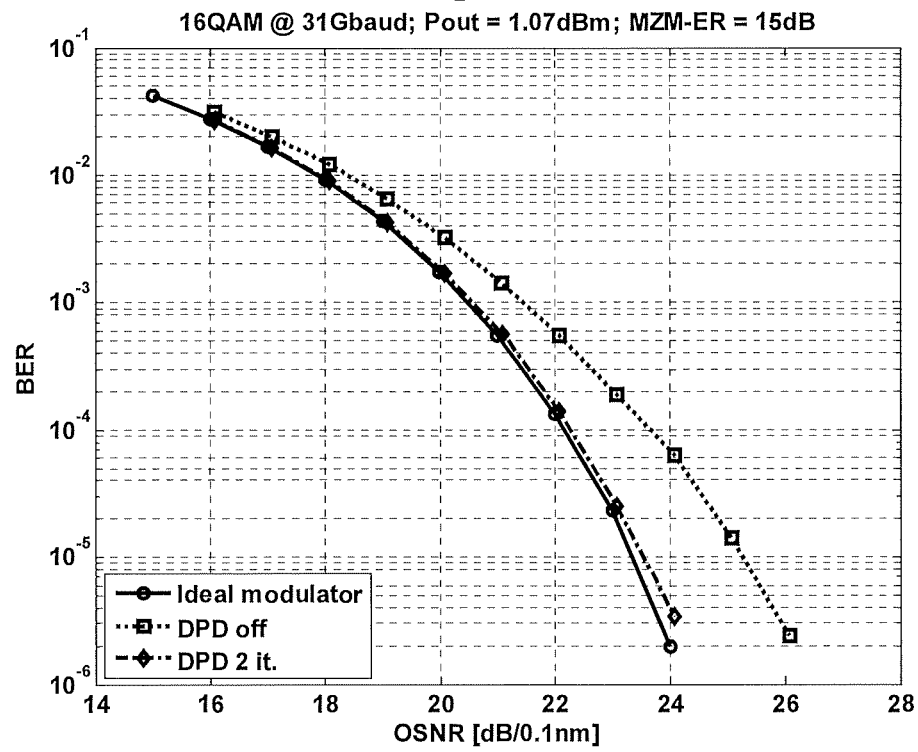
Figure 9:
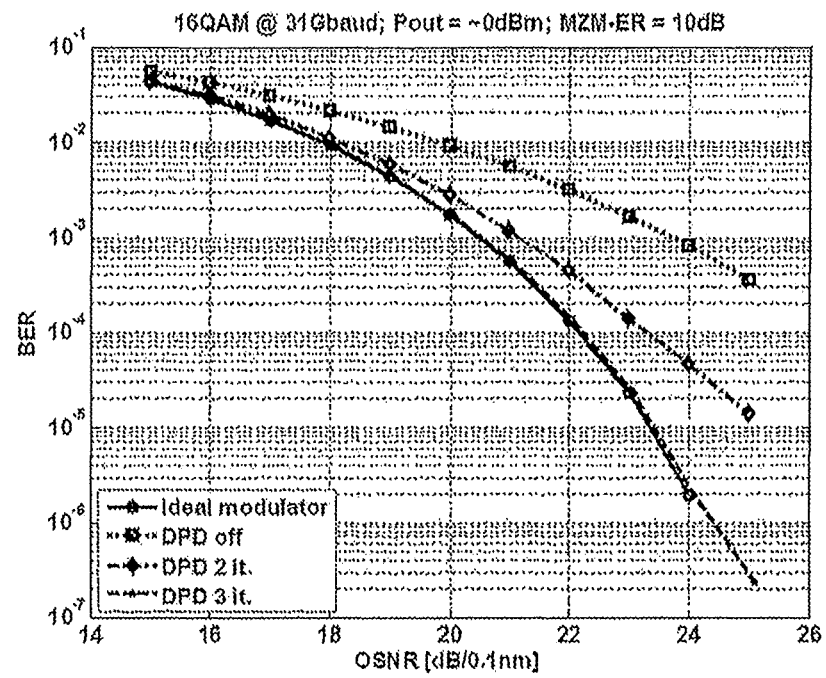
Figure 10:
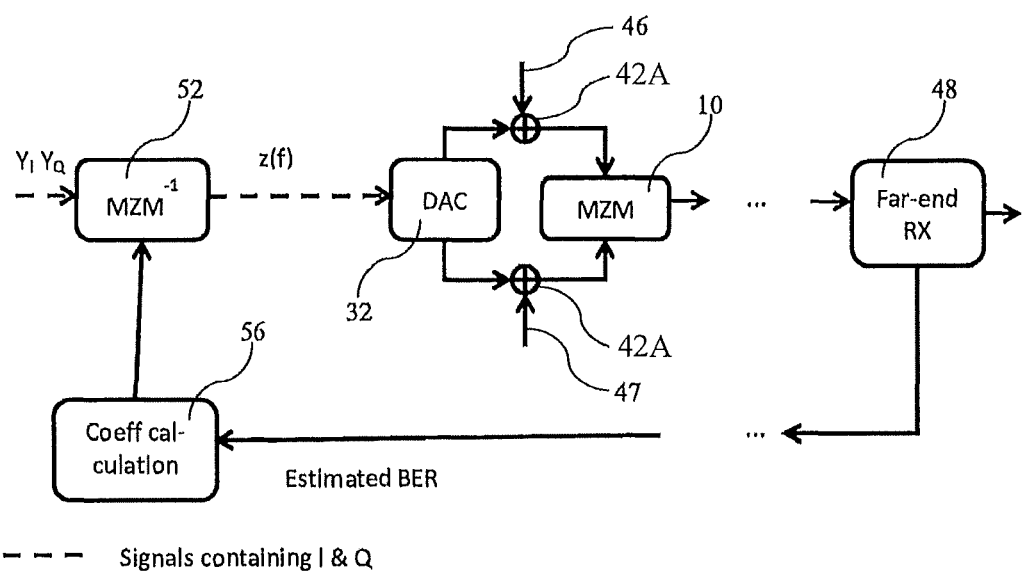
Figure 11:
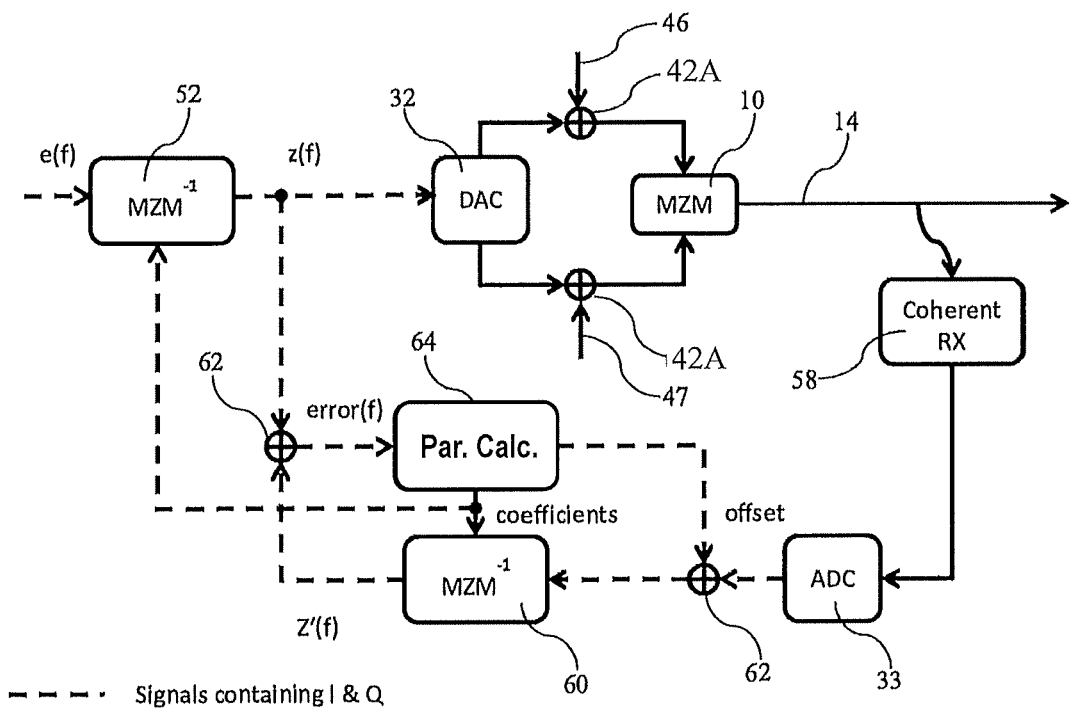
Figure 12:
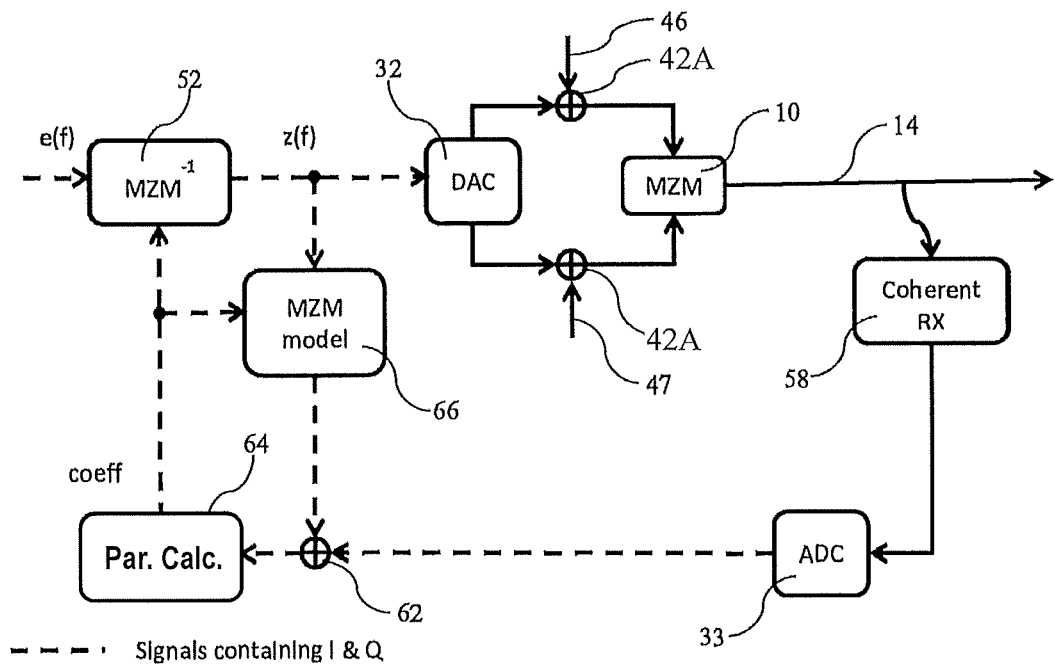
Figure 13:
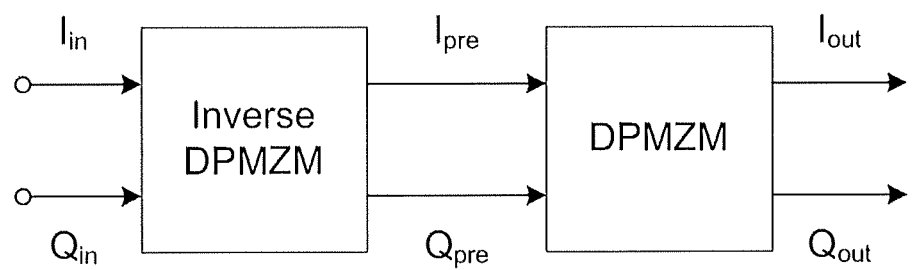

FIG. 1 shows a schematic view of a prior art DPMZM,

FIG. 2 shows a flow diagram of a single iteration of a pre-distortion algorithm according to the invention, FIG. 3 shows a flow diagram of two consecutive iterations of a pre-distortion algorithm according to the invention, FIG. 4 shows a flow diagram of three consecutive iterations of a pre-distortion algorithm according to the invention, FIG. 5 shows a DPMZM device employing a modified version of a generally pre-known bias control, in which error offsets are introduced, FIG. 6 shows a DPMZM device employing a novel bias control relying on a feedback channel from a far-end receiver, FIGS. 7 to 9 show the performance of the iterative pre-distortion algorithm as indicated in FIGS. 3 and 4 in simulative investigations, FIG. 10 shows a DPMZM device including a parameter calculating unit adapted to modify model parameters such as to optimize a quality indicator received from a far-end receiver, FIG. 11 shows a DPMZM device including a parameter calculating unit employing an indirect learning architecture, FIG. 12 shows a DPMZM device including a parameter calculating unit, and employing an inverse calculation unit, and FIG. 13 shows a general setup of a DPMZM and an inverse system providing pre-distorted complex input to the DPMZM.

DESCRIPTION OF THE PREFERRED EMBODIMENTS

Turning back to the DPMZM 10 of FIG. 1, in the following discussion we assume an infinite or a perfectly compensated outer extinction ratio of the outer MZM and concentrate on the inner MZMs 20, 22. Further, for the moment we assume that each inner MZM 20, 22 is biased to deliver the minimum possible output power when the corresponding driving signal $V_I$, $V_Q$ is zero. Note that from an operation point of view, the latter would actually not be an ideal starting point, as this does not correspond to the biasing that eventually leads to the best signal quality. However, the assumption is made purely for mathematical purposes, as it leads to very simple equations, the solutions of which then lead to DC-components in the pre-distorted first and second driving voltages $V_I$, $V_Q$ that account for a more proper biasing.

With appropriate normalization of the electric field amplitude by the input electric field amplitudes in the respective first and second arms 16, 18 of the outer MZMs, the input/output relations of the first and second inner MZMs 20, 22 are as follows:

$$E_I = \frac{1}{1+\beta_I}\left[\exp\left(j \cdot \frac{\pi}{2} \cdot \left(\frac{V_I}{V_\pi} - 1\right)\right) + \beta_I \cdot \exp\left(-j \cdot \frac{\pi}{2} \cdot \left(\frac{V_I}{V_\pi} - 1\right)\right)\right] \text{ and} \quad (2)$$

$$E_Q = \frac{1}{1+\beta_Q}\left[\exp\left(j \cdot \frac{\pi}{2} \cdot \left(\frac{V_Q}{V_\pi} - 1\right)\right) + \beta_Q \cdot \exp\left(-j \cdot \frac{\pi}{2} \cdot \left(\frac{V_Q}{V_\pi} - 1\right)\right)\right], \quad (3)$$

Herein, $E_I$ and $E_Q$ are the normalized in-phase and quadrature components of the optical signal generated in response to the first and second driving voltages $V_I$, $V_Q$, respectively. $V_\pi$, $\beta_I$ and $\beta_Q$ are positive characteristic constants of the DPMZM 10. More particularly, the constants $\beta_I$ and $\beta_Q$ represent the ratio of the electric field amplitude in the two arms of the first and second inner MZMs 20, 22, respectively. In other words, a value $\beta_I=1$ would resemble a situation where the power is evenly split between the two arms of the first inner MZM 20, while any deviation from this ideal behavior would lead to a value $\beta_I$ different from 1. The symbol "j" resembles the imaginary part of a complex number in the usual manner.

It is further assumed that the outer MZM is biased, by means of the electrodes 28 provided in the second arm 18 thereof, such as to establish a 90° phase shift between the in-phase and quadrature components $E_I$, $E_Q$ in the combined or total electric field amplitude E, i.e.

$$E = E_I + j \cdot E_Q. \quad (4)$$

Introducing the expressions from Eqs. (2) and (3) above and carrying out a number of arithmetic steps, we obtain the following expression for the combined or total electric field amplitude E:

$$E = \sin\left(\frac{\pi}{2} \cdot \frac{V_I}{V_\pi}\right) + \gamma_Q \cdot \cos\left(\frac{\pi}{2} \cdot \frac{V_Q}{V_\pi}\right) + \quad (5)$$
$$j \cdot \left[\sin\left(\frac{\pi}{2} \cdot \frac{V_Q}{V_\pi}\right) - \gamma_I \cdot \cos\left(\frac{\pi}{2} \cdot \frac{V_I}{V_\pi}\right)\right], \text{ and}$$

$$\gamma_I = \frac{1-\beta_I}{1+\beta_I} \quad (6)$$

$$\gamma_Q = \frac{1-\beta_Q}{1+\beta_Q}. \quad (7)$$

where we introduced:

Herein, $\gamma_I$ and $\gamma_Q$ are the square root of the inverse power extinction ratios $ER_I$, $ER_Q$ of the first and second inner MZM 20, 22. Usually the extinction ratios $ER_I$ and $ER_Q$ of the first and second inner MZMs 20, 22 are represented as dB values as follows:

$$ER_I = -20 \cdot \log_{10}|\gamma_I| \quad (8)$$

and $$ER_Q = -20 \cdot \log_{10}|\gamma_Q| \quad (9)$$

From Eq. (5) it can be seen that the DPMZM 10 exhibits an intrinsic sinusoidal non-linearity and, if the inner ERs are finite, additional I-Q-cross-talk.

In a next step, we describe an algorithm for the computation of the driving voltages $V_I$ and $V_Q$ that produce the desire transmit signal if applied to the electrodes 24 and 26 of the non-ideal DPMZM. Assuming the above model of the imperfect DPMZM with non-vanishing inverse extinction ratios $\gamma_I$, $\gamma_Q$, from Eq. (5) it is seen that the appropriate driving voltages $V_I$ and $V_Q$ to produce the I- and Q-components $y_I$, $y_Q$ of a desired transmit signal amount to a solution of the following non-linear equation system:

$$y_I = \sin\left(\frac{\pi}{2} \cdot \frac{V_I}{V_\pi}\right) + \gamma_Q \cdot \cos\left(\frac{\pi}{2} \cdot \frac{V_Q}{V_\pi}\right) \tag{10}$$

$$y_Q = \sin\left(\frac{\pi}{2} \cdot \frac{V_Q}{V_\pi}\right) - \gamma_I \cdot \cos\left(\frac{\pi}{2} \cdot \frac{V_I}{V_\pi}\right).$$

For solving the above equation system for $V_I$ and $V_Q$, the following iterative pre-distortion algorithm may be employed:

$$V_I^{(n)} = \frac{2 \cdot V_\pi}{\pi} a\sin\left(y_I - \gamma_Q \cdot \cos\left(\frac{\pi}{2} \cdot \frac{V_Q^{(n-1)}}{V_\pi}\right)\right) \tag{11}$$

$$V_Q^{(n)} = \frac{2 \cdot V_\pi}{\pi} a\sin\left(y_Q + \gamma_I \cdot \cos\left(\frac{\pi}{2} \cdot \frac{V_I^{(n-1)}}{V_\pi}\right)\right)$$

$$(n = 1, 2, \cdots, K),$$

where the positive integer K is a number of iterations, and $V_I^{(n)}$ and $V_Q^{(n)}$ are the approximations of the desired driving voltages $V_I$ and $V_Q$ at the $n^{th}$ iteration. From the above iteration algorithm, the concept of "pre-distortion" becomes particularly apparent. For example, in a perfect DPMZM without cross talk, $\gamma_Q$ would be zero and $V_I^{(n)}$ would be dependent on the desired I-component $y_I$ of the transmit signal only. With non-vanishing $\gamma_Q$, a "distortion" is introduced to $V_I$, which distortion is dependent on $V_Q$ and in fact accounts for the cross-talk introduced by non-vanishing parameters $\gamma_I$, $\gamma_Q$ in an anticipatory manner.

The algorithm can be conveniently initialized with $$V_I^{(0)} = 0$$

$$V_Q^{(0)} = 0, \tag{12}$$

which results into $$V_I^{(1)} = \frac{2 \cdot V_\pi}{\pi} a\sin(y_I - \gamma_Q) \tag{13}$$

$$V_Q^{(1)} = \frac{2 \cdot V_\pi}{\pi} a\sin(y_Q + \gamma_I).$$

If desired, the first iteration can be slightly improved with negligible effort by using the following initialization:

$$V_I^{(1)} = \frac{2 \cdot V_\pi}{\pi} a\sin\left(y_I - \gamma_Q \cdot E\left\{\cos\left(\frac{\pi}{2} \cdot \frac{y_Q}{V_\pi}\right)\right\}\right) \tag{14}$$

$$V_Q^{(1)} = \frac{2 \cdot V_\pi}{\pi} a\sin\left(y_Q + \gamma_I \cdot E\left\{\cos\left(\frac{\pi}{2} \cdot \frac{y_I}{V_\pi}\right)\right\}\right).$$

Herein, $E\{\bullet\}$ denotes a stochastic expectation.

FIG. 2 illustrates a single iteration of the pre-distortion algorithm. In case of a digital implementation, the non-linear functions can be conveniently approximated by spline, i.e. piecewise linear interpolation. Since the non-linear functions are completely unaffected by the actual inner extinction ratios, the spline coefficients can be pre-computed offline and implemented via constant look-up tables. The parameters $\gamma_I$ and $\gamma_Q$, on the other hand, need to be calibrated for each individual DPMZM 10, either upon manufacturing or upon operation and can possibly be tracked and adjusted over time in a fashion described in more detail below.

Notably, when cascading multiple pre-distortion stages in the iterative solution according to Eq. (11), the input non-linear functions at each stage can be combined with the output non-linear functions of the previous stage and conveniently implemented in a single operation. Consequently, every iteration requires in fact the computation of only two non-linear functions with one real input and one real output which can be carried out rapidly in real-time under operation of the DPMZM 10.

To appreciate this fact, in FIG. 3 a 2-stage pre-distortion algorithm is displayed, where the constants $I_{init}$ and $Q_{init}$ were introduced as the initial values of the iteration. If the initialization of Eq. (12) is adopted, we set $$I_{init} = 1$$

$$Q_{init} = 1. \tag{15}$$

Alternatively, for the initialization of Eq. (14) we set $$I_{init} = E\left\{\cos\left(\frac{\pi}{2} \cdot \frac{y_i}{V_\pi}\right)\right\} \tag{16}$$

$$Q_{init} = E\left\{\cos\left(\frac{\pi}{2} \cdot \frac{y_Q}{V_n}\right)\right\}.$$

For further exemplification purposes, in FIG. 4 an implementation of the 3-stage pre-distortion algorithm is shown. From this, generalizations to more stages will be apparent to the person skilled in the art.

As mentioned above, the recursion of Eq. (11) was derived under the assumption that each of the inner MZMs 20, 22 is independently biased to deliver the minimum possible output power when the corresponding modulating signal $V_I$ and $V_Q$ is zero. However, if the inner extinction ratio is finite, in the absence of pre-distortion, this biasing condition results into imperfect carrier suppression in the optical output of the DPMZM 10. The consequent residual carrier component is detrimental because it impairs the demodulation algorithms, wastes part of the available optical power, and enhances nonlinearities in the fiber. Therefore, the assumed biasing point in the above mathematical derivation, although leading to simpler pre-distortion equations, is actually neither optimal nor desirable in the absence of pre-distortion.

In the presence of pre-distortion, the suboptimal bias is not problematic, since the recursion of Eq. (11) is able to suppress the residual carrier and to produce the desired optical signal. In the model considered so far, this is possible because the pre-distortion as derived by the iteration of Eq. (11) will automatically lead to values of $V_I$ and $V_Q$ including a DC offset representing the optimal biasing condition. In the mathematical model presented, the pre-distortion hence injects a DC-offset into the driving voltages and thereby effectively corrects the biasing point. However, in practical implementations, the driving voltages $V_I$, $V_Q$, i.e. the modulating signal, will generally be AC-coupled with the inner MZMs 20, 22 and a bias correction provided through the driving voltages $V_I$ and $V_Q$ would not reach the DPMZM 10.

In the present invention, this difficulty can be overcome by adopting a proper automatic bias control scheme which suppresses the residual carrier. Such a bias scheme, which in fact reintroduces the DC-correction that has been removed from the modulating signal by the AC-coupling, guarantees that the sum of the bias and driving voltage and, thus, the optical output of the DPMZM 10 remain unchanged. Remarkably, the pre-distortion can still be computed according to the simple recursion (11), i.e. under the assumption that each inner MZM 20, 22 is biased for minimum output power, because the resulting offset is filtered out anyway and does not interfere with the bias control.

Several automatic bias control schemes for a DPMZ have been proposed in prior art, see e.g. P. S. Cho, J. B. Khurgin, and I. Shpantzer, "*Closed-loop bias control of optical quadrature modulator*," IEEE Photonics Technology Letters, vol. 18, no. 21, pp. 2209-2211, November 2006 and M. Sotoodeh, Y. Beaulieu, J. Harley, and D. L. McGhan, "*Modulator bias and optical power control of optical complex E-field modulators*", IEEE Journal of Lightwave Technology, vol. 29, no. 15, pp. 2235-2248, August 2011. These schemes control the bias voltages according to a gradient descent algorithm applied to an algorithm-specific error signal. Since they are designed to work on an ideal DPMZM with infinite ERs, they fail to suppress the residual carrier when the inner MZMs have a finite ER. However, it is possible to adapt such standard bias controls by injecting a proper offset into the error signal. The offset can be determined by factory calibration in such a way that the modified scheme suppresses the residual carrier.

FIG. 5 illustrates a DPMZM device employing a modified version of the standard bias control. As is seen in FIG. 5, digital representations of the driving voltages $V_I$, $V_Q$ as computed with the recursion of Eq. (11) are inputted at inputs 30 and DA-converted at DA-converters 32. The thus obtained analog signals are AC-coupled to the DPMZM 10. Due to the AC-coupling, a DC-component of the driving voltages $V_I$ and $V_Q$ as obtained from the iteration of Eq. (11) will be lost.

A part of the optical output signal 14 of the DPMZM 10 is branched off and detected with a photo detector 34. The detection signal of the photo detector 34 is coupled to a bias error computer 36 which computes an error signal in a way per se known from the above citations. Two I- and Q-error signals 38, 40 are outputted from the bias error computer 36, to which error offsets are added using adders 42. The error offset can be determined by factory calibration in such a way that the modified scheme suppresses the residual carrier. These additional error offsets for residual carrier suppression are not provided for in known automatic bias control schemes and specifically relate to the operation of the DPMZM device of the present invention accounting for finite inner ERs.

The error signals 38, 40, together with the added offsets, are introduced to a bias voltage computer 44 which in turn computes a bias 46 for the first inner MZM 20 and a bias 47 for the second MZM 22 which are added to the AC-coupled analog driving voltages $V_I$, $V_Q$ by further adders 42 prior to introducing them to the DPMZM 10.

A further DPMZM device according to an embodiment of the invention employs a novel bias control that relies on a feedback channel from a far-end receiver to the transmitter. In the case of coherent transmission, digital demodulation algorithms at the receiver are able to detect the power of the residual carrier generated at the transmitter. The demodulator shall send back the power of the detected residual carrier to the bias control, which uses this information in a gradient descent algorithm to suppress directly the residual carrier.

A corresponding DPMZM device is shown in FIG. 6. The DPMZM device of FIG. 6 is able to carry out a conventional bias control scheme using the photo detector 34, the bias error computer 36 and the bias voltage computer 44 as shown in FIG. 5, but without the error offset introduction of FIG. 5. This standard biasing algorithm, which is based on the standard local error signal defined along the lines of the previously cited references is, however, only provided for as a fallback means in the initial convergence phase. The proper bias control is based on an error signal 51 generated by a residual carrier detector 50 provided in a far-end receiver 48. This error signal 51 may in fact directly correspond to the power of the residual carrier. The bias error computer 44 may then iteratively adapt the bias voltages 46, 47 by minimizing the error indicated by error signal 51. The bias error computer 36 and the bias voltage computer 44 hence in combination form an example of the bias component control unit referred to in the summary of the invention. Note that this bias component control unit provides I- and Q-bias values which "account for" the DC component of the calculated driving voltage, but which also account for the customary bias control. In other words, the contribution corresponding to the DC-components of $V_I$ and $V_Q$ are not separately determined or applied, but are nevertheless automatically accounted for in the embodiment of FIG. 6.

Both DPMZM devices of FIGS. 5 and 6 hence allow for implementing a proper bias control scheme, i.e. a bias control scheme that suppresses the residual carrier and is compatible with the proposed iterative pre-distortion as defined in Eq. (11).

With reference to FIGS. 7 to 9, the performance of the proposed pre-distortion algorithm is demonstrated by means of simulative investigations. In the analysis, a 16-QAM transmission at 31 Gsymbols/s in the presence of root Nyquist spectral shaping with a digital pre-distortion (DPD) running at two samples per symbol was considered. For the sake of simplicity, the quantization noise introduced by the DAC was neglected, and the same inner ERs for the first and second DPMZMs 20, 22 were assumed. The back-to-back performance (i.e. without transmission fiber in between) was evaluated on the basis of the bit error rate (BER) as a function of the optical signal-to-noise ratio (OSNR) and compared with the performance of a reference system without DPD. In the absence of DPD, the biasing points of the inner MZMs 20, 22 were optimized for minimal BER. In the presence of DPD, as discussed above, the biasing point was chosen such that the residual carrier is maximally suppressed. For a fair comparison, the same average optical power with and without DPD was transmitted. In the absence of DPD, the swing of the driving voltages $V_I$, $V_Q$ is smaller and the system benefits from using only a limited region of the MZM characteristics. In the presence of DPD, which enhances the signal peaks, i.e. the maximum values of $V_I$ and $V_Q$, a larger non-linear portion of the MZM characteristics is used, but the nonlinearity and the I-Q-cross-talk are pre-compensated.

FIGS. 7 and 8 illustrate the cases of an inner ER of 20 dB and 15 dB, respectively. When the DPD is active, the inner MZMs 20, 22 are fully driven, i.e. the peak-to-peak swings of the driving voltages $V_I$, $V_Q$ are fixed to $2 \cdot V_\pi$. The simulation results show that, remarkably, only two iterations of the iterative pre-distortion algorithm of Eq. (11) are sufficient to achieve the ideal performance corresponding to a hypothetical ideal DPMZM. By contrast, the system without pre-distortion suffers from a significant OSNR penalty.

FIG. 9 illustrates related simulation results for inner ERs as low as 10 dB. In order to avoid clipping in the implementation of the non-linear functions, the power of the modulated signal was backed-off by 1 dB, i.e. the swing of the modulated signal was reduced by 1 dB as compared to the previous two examples. In this case, three iterations of the DPD algorithm were necessary to achieve the ideal performance, whereas the system without DPD exhibits more than 3 dB penalty at a BER of $10^{-3}$.

The iterative solution according to Eq. (11) of the system of coupled non-linear equations (10) turns out to be very attractive. One advantage is the low computation cost, which is both due to the underlying mathematical structure and the fact that in practice very few iterations are necessary. Further, the memory needed for look-up tables (if employed) for the non-linear functions is very moderate. However, the present invention is not limited to this particular algorithm, and the present invention instead also considers calculation units employing other algorithms. An alternative very useful calculation is derived from a 2-stage implementation of the iteration algorithm of Eq. (11). From FIG. 2, and noting that $\cos(a\sin(x))=\sqrt{1-x^2}$, the second iteration of the driving voltages can be obtained as follows:

$$V_I^{(2)} = \frac{2 \cdot V_\pi}{\pi} a\sin\left(y_I - \gamma_Q \cdot \sqrt{1-(y_Q + \gamma_I \cdot (I_{init}))^2}\right) \quad (17)$$

$$V_Q^{(2)} = \frac{2 \cdot V_\pi}{\pi} a\sin\left(y_Q + \gamma_I \cdot \sqrt{1-(y_I - \gamma_Q \cdot Q_{init})^2}\right).$$

In the above expressions, the square roots can be approximated by a Taylor expansion. If the square roots are expanded to second order terms in the components $y_I$, $y_Q$ of the desired transmit signal, the following alternative solution can be obtained:

$$V_I = \frac{2 \cdot V_\pi}{\pi} a\sin(y_I + a_I \cdot y_Q^2 + b_I \cdot y_Q + c_I) \quad (18)$$

$$V_Q = \frac{2 \cdot V_\pi}{\pi} a\sin(y_Q + a_Q \cdot y_I^2 + b_Q \cdot y_I + c_Q).$$

where the coefficients $a_I$, $b_I$, $c_I$, $a_Q$, $b_Q$, $c_Q$ depend implicitly on $\gamma_I$ and $\gamma_Q$. This expression suggests an alternative implementation that requires only two evaluations of a single non-linear function besides the computation of the multivariate polynomials in $y_I$ and $y_Q$. Again, the non-linear functions can be conveniently approximated by spline, i.e. piecewise linear interpolation. In this implementation, only two look-up tables for the function $a\sin(x)$, i.e. one for the I- and one for the Q-component, are necessary.

In practice, the effectiveness of the pre-distortion requires an accurate characterization of the imperfect DPMZM. In particular, the recursive implementation according to Eq. (11) depends directly on $\gamma_I$ and $\gamma_Q$ which need to be precisely determined. Also, the polynomial implementation according to Eq. (18) depends on six real coefficients, which themselves are implicitly dependent on $\gamma_I$ and $\gamma_Q$ and can be individually tuned. In both cases, the parameters of the DPD can be set during factory calibration. In addition or alternatively, they can be continuously adapted at run time.

FIG. 10 is an example of a DPMZM device according to a preferred embodiment of the present invention. The DPMZM device comprises, in addition to the DPMZM 10 itself, a calculation unit 52 receiving desired in-phase and quadrature components $y_I$, $y_Q$ for the transmit signal to be generated. The calculation unit 52 is designated as "MZM$^{-1}$" in the figure, because effectively, it represents the inverse operation of the DPMZM 10 to the extent that the underlying model captures the true characteristics and deficiencies of the DPMZM 10, and to the extent that the algorithm provides an exact solution of the set of coupled equations, depending on the number of iterations and the like.

The calculation unit 52 outputs the first and second driving voltages $V_I$, $V_Q$, which are converted to analog signals by a DAC 32 and are applied to the first and second inner MZMs 20, 22 (not shown in FIG. 10) of the DPMZM 10. Again, the DC-components of the first and second driving voltages $V_I$, $V_Q$ are lost due to AC-coupling (not shown in FIG. 10) which is compensated by adding corresponding bias components using adders 42 in a manner described with reference to FIGS. 5 and 6. Note that for simplicity the bias control units are not shown in FIGS. 10 to 12.

Further shown in FIG. 10 is a far-end receiver 48 receiving the optical output signal 14 transmitted by the DPMZM 10. The far-end receiver 48 returns, through a feedback channel 54, a quality indicator, in the present example an estimated BER, to a parameter calculation unit 56. The parameter calculation unit 56 adjusts the parameters of the model employed by the calculation unit 52 such as to minimize the estimated BER. The parameters calculated by the parameter calculating unit 52 can for example be the values $\gamma_I$ and $\gamma_Q$ characterizing the finite ERs of the first and second inner MZMs 20, 22, or the coefficients $a_I$, $b_I$, $c_I$ and $a_Q$, $b_Q$, $c_Q$ in the polynomial approximation according to Eq. (18), which is why in the embodiment shown in FIG. 10, the parameter calculation unit 52 is referred to as "coefficient calculation". Note, however, that the model parameters employed by the models of the invention and determined by the parameter calculation unit 52 generally do not need to be coefficients but could also be other types of parameters.

FIG. 11 shows an alternative DPMZM device allowing for adapting the parameters or coefficients by means of what is referred to as an "indirect learning architecture" introduced by C. Eun and E. J. Powers in "*A new Volterra predistorter based on the indirect learning architecture*", IEEE Transactions on Signal Processing, pp. 223-227, January 1997.

In FIG. 11, the calculation unit receives frequency dependent target values $Y_I^{tgt}(f)$, (short noted as "e(f)") and in response calculates corresponding driving voltages referred to as "z(f)" for short in FIG. 11.

A local coherent monitoring receiver 58 receives part of the output signal 14 and provides hence the actual in-phase and quadrature components $Y_I^{act}(f)$ and $Y_Q^{act}(f)$. The better the pre-distortion, or, in other words, the closer the model employed by the calculating unit 52 is to the true MZM 10, the more similar $Y_I^{act}(f)$ $Y_Q^{act}(f)$ should be to the target values $Y_I^{tgt}(f)$, $Y_Q^{tgt}(f)$, respectively.

In FIG. 11, $Y_I^{tgt}$ ($Y_Q^{tgt}$) and $Y_I^{act}$ ($Y_Q^{act}$) are not directly compared. Instead, in the indirect learning architecture of FIG. 11, $Y_I^{act}$ and $Y_Q^{act}$ are applied to a copy of the calculating unit 52 designated at 60. The output of this copy 60 are hence driving voltages referred to as "z'(f)" which, if the models underlying the calculation unit 52 and its copy 60 were precisely reflecting the true MZM 10, should be identical with the applied driving voltages z(f). At a subtracting unit 62, the difference between z(f) and z'(f) is inputted as a frequency dependent error signal into a parameter calculating unit 64 which adapts the parameter (coefficients) such as to minimize the error.

Note that the parameter calculation unit 64 allows for introducing artificial offsets $y_I^{off}$, $y_Q^{off}$ in $y_I$, $y_Q$ using a further subtractor 62, meaning that the locations of the QAM states are purposefully shifted in the two-dimensional plane. This can be desirable to better exploit the capabilities of the actual DPMZM.

FIG. 12 indicates yet an alternative DPMZM device which is similar to that of FIG. 11. The main difference is that instead of a copy of the calculation unit 52, which essentially reflects an inverse model of the DPMZM 10, this version employs an "inverse" calculation unit 66 which performs the inverse calculation of the calculation unit 52 and can hence be regarded as the direct model of the DPMZM 10. Note in this regard that of course the calculation units 52, 60 and 66 all are based on the same model of the true DPMZM but differ by the corresponding algorithm receiving $y_I$, $y_Q$ as inputs and yielding $V_I$ and $V_Q$ as outputs or vice versa.

The inverse calculation unit 66 receives the driving voltages (referred to as "z(f)" in FIG. 12) and calculates target signals based thereon, from which actual signals as picked up by the coherent monitoring receiver 58 are subtracted by the subtracting unit 62.

The parameter calculation or coefficient adaptation as employed in FIGS. 11 and 12 can be based on a minimization of the mean square error (MSE) between the desired and actual transmit signals. The MSE can be expressed either in the frequency or in the time domain. A general frequency formulation is $$MSE_f = \int w(f) E[(Y_I^{act}(f) - Y_I^{tgt}(f))^2 + (Y_Q^{act}(f) - Y_Q^{tgt}(f))^2] df, \quad (19)$$

where w(f) is the desired weighting function, E[•] denotes stochastic expectation, $Y_I^{tgt}(f) + j \cdot Y_Q^{tgt}(f)$ is the desired transmit signal at frequency f and $Y_I^{act}(f) + j \cdot Y_Q^{act}(f)$ is the actual transmit signal at frequency f, as captured by the monitor receiver 58. A possible formulation in the time domain is $$MSE_t = E[y_I^{act} - y_I^{tgt})^2 + (y_Q^{act} - y_Q^{tgt})^2]. \quad (20)$$

To provide the DPD with additional degrees of freedom, it may be advantageous allowing a DC offset on the transmit constellation. In this case $$MSE_{off} = \quad (21)$$
$$E[(y_I^{act} - y_I^{tgt} - y_I^{off})^2 + (y_Q^{act} - y_Q^{tgt} - y_Q^{off})^2] + \lambda \frac{(y_I^{off})^2 + (y_Q^{off})^2}{(y_I^{tgt})^2 + (y_Q^{tgt})^2},$$

Note that in FIGS. 11 and 12, the calculation units 52 are referred to as "MZM$^{-1}$", because essentially the calculation unit establishes a model of the actual, imperfect DPMZM 10 but carries out a calculation that inverts its operation. From a more general viewpoint, a DPMZM 10 can be modelled as a memory-free non-linear system with complex input and complex output. To pre-compensate the DPMZM 10, according to the invention one generally synthesizes the inverse system and then inserts it between the source of the baseband modulating signal and the DPMZM. The desired base-band signals are provided to the inverse system, which then delivers the corresponding pre-distorted complex input to the DPMZM. This generic setup is illustrated in FIG. 13. If the inverse system is modelled with sufficient accuracy, the DPMZM 10 returns a close approximation of the desired signal as a response to the pre-distorted input.

Generally, a memory-free non-linear system can be represented by a look-up table. Accordingly, one could think of synthesizing the inverse DPMZM simply by a look-up table with complex input and complex output. However, such a more straight-forward approach has significant implementation drawbacks. If real and imaginary parts of the complex signals are represented with n bits, respectively, the required look-up table would have 2n input bits and 2n output bits and would require a local storage of $(2n)2^{2n}$ bits. This can quickly become a prohibitive size, especially if circuit parallelization is also taken into account, as required to support optical data rates on integrated digital circuits. Instead, employing a model as described above and solving a corresponding set of coupled non-linear equations iteratively or in some other approximated way is a much more efficient way of handling this problem.

The embodiments described above and the accompanying figures merely serve to illustrate the method according to the present invention, and should not be taken to indicate any limitation of the method. The scope of the patent is solely determined by the following claims.

LIST OF REFERENCE SIGNS 10 dual parallel Mach-Zehnder-modulator (DPMZM)
12 optical input
14 optical output
16 first arm
18 second arm
20 first inner MZM
22 second inner MZM
24 set of electrodes
26 set of electrodes
28 set of electrodes
30 input
32 DA-converter
34 photo detector
36 bias error computer
38 error signal
40 error signal
42 adder
44 bias voltage computer
46 bias
47 bias
48 far-end receiver
50 residual carrier detector
51 error signal
52 calculation unit
54 feedback channel
56 parameter calculation unit
58 local coherent monitoring receiver
60 copy of the calculating unit 52
62 subtracting unit
64 parameter calculating unit
66 inverse calculation unit

| LIST OF ABBREVIATIONS | |
|---|---|
| AC | Alternating Current |
| ADC | Analog-to-Digital Converter |
| BER | Bit Error Rate |
| CMOS | Complementary Metal-Oxide-Semiconductor |
| DAC | Digital-to-Analog Converter |
| DC | Direct Current |
| DPD | Digital Pre-Distorsion |
| DPMZM | Dual Parallel Mach-Zehnder Modulator |
| ER | Extinction Ratio |
| MSE | Mean Square Error |
| I | In-phase component |
| MZM | Mach-Zehnder Modulator |
| OFDM | Orthogonal Frequency Division Multiplexing |
| OSNR | Optical Signal-to-Noise Ratio |
| Q | Quadrature component |
| QAM | Quadrature Amplitude Modulation |

The invention claimed is:

1. A dual parallel Mach-Zehnder-modulator (DPMZM) device for generating a modulated optical signal, comprising:
   a first inner Mach-Zehnder-modulator (MZM) operable to generate an in-phase component $E_I$ of the modulated optical signal in response to a first driving voltage $V_I$, the first driving voltage $V_I$ comprising at least a first AC component;
   a second inner MZM operable to generate a quadrature component $E_Q$ of the modulated optical signal in response to a second driving voltage $V_Q$, the second driving voltage $V_Q$ comprising at least a second AC component; and
   a calculation unit comprising at least one electrical component, the calculation unit configured for
      receiving an in-phase component $y_I$ and a quadrature component $y_Q$ of a base-band signal,
      determining at least the first AC component of the first driving voltage $V_I$ as a function of both the in-phase component $y_I$ and the quadrature component $y_Q$ of the base-band signal, and
      determining at least the second AC component of the second driving voltage $V_Q$ as a function of both the in-phase component $y_I$ and the quadrature component $y_Q$ of the base-band signal.

2. The DPMZM device of claim 1, wherein in the calculation, the calculation unit employs at least one model parameter relating to a finite inner extinction ratio of at least one of the first inner MZM and the second inner MZM.

3. The DPMZM device of claim further comprising a parameter calculating unit that comprises an electronic component, the parameter calculating unit operative to:
   receive a quality indicator relating to a quality of an optical signal received by a receiver, and
   modify, in response to the received quality indicator, the at least one model parameter to improve a quality of the modulated optical signal generated using the DPMZM device.

4. The DPMZM device of claim 3, wherein the quality indicator is relates at least in part to at least one of:
   a bit-error rate related to the optical signal received by the receiver, and
   an estimate of a bit-error-rate related to the optical signal received by the receiver.

5. The DPMZM device of claim 3, wherein the quality indicator is relates at least in part to at least one of:
   a power of a residual carrier, and
   an estimate of a power of a residual carrier.

6. The DPMZM device of claim 3, wherein the quality indicator relates at least in part to a mean square error between a target transmit signal and an actual transmit signal.

7. The DPMZM device of one of claim 3, wherein the receiver is one of the following:
   a coherent far-end receiver, and
   a coherent monitoring receiver associated with local to the DPMZM device.

8. The DPMZM device of claim 1, wherein the calculation unit is further configured for determining at least the first AC component of the first driving voltage $V_I$ and at least the second AC component of the second driving voltage $V_Q$ to mitigate an adverse effect of I-Q cross talk introduced by at least one non-ideal characteristic of the DPMZM device.

9. The DPMZM device of claim 1, wherein the DPMZM device further comprises an AC-coupling for coupling the first driving voltage $V_I$ and the second driving voltage $V_Q$ as, and
   wherein a first and second biasing electrodes are biasing electrode is associated with the first inner MZM and a second biasing electrode is associated with the second inner MZM, and
   wherein the first biasing electrode is operative to apply a first bias component to the first inner MZM, the first bias component corresponding to a first DC component of the first driving voltage $V_I$, and
   wherein the second biasing electrode is operative to apply a second bias component to the second inner MZM, the second bias component corresponding to a second DC component of the second driving voltage $V_Q$.

10. The DPMZM device of claim 9, further comprising a bias component control unit operative to adjust, in response to at least one input to the bias component control unit, at least one of the first bias component and the second bias component, the at least one input comprising at least one of:
    an error-indicating signal communicated by a far-end receiver, or
    a quality indicator, relating to a quality of an optical signal received by a far-end receiver.

11. The DPMZM device of claim 10, wherein the bias component control unit is configured to adjust the first bias component and the second bias component using a gradient descent algorithm minimizing an error indicated by at least one of:
    the error indicating signal, and
    the quality indicator.

12. The DPMZM device of claim 1, wherein each of the first inner MZM and the second inner MZM are independently biased,
    wherein the first inner MZM delivers a minimum possible output power when the first driving voltage $V_{I\ is\ zero}$, and
    wherein the second inner MZM delivers a minimum possible output power when the second driving voltage $V_Q$ is zero.

13. The DPMZM device of claim 1, wherein the calculation unit is configured for solving two coupled non-linear equations relating the in-phase component $y_I$ and the quadrature component $y_Q$ of the desired base-band signal to the first driving voltage $V_I$ and the second driving voltage $V_Q$.

14. The DPMZM device of claim 13, wherein the two coupled non-linear equations are represented as follows:

$$y_I = \sin\left(\frac{\pi}{2} \cdot \frac{V_I}{V_\pi}\right) + \gamma_Q \cdot \cos\left(\frac{\pi}{2} \cdot \frac{V_Q}{V_\pi}\right)$$

$$y_Q = \sin\left(\frac{\pi}{2} \cdot \frac{V_Q}{V_\pi}\right) - \gamma_I \cdot \cos\left(\frac{\pi}{2} \cdot \frac{V_I}{V_\pi}\right)$$

wherein $V\pi$, $\gamma_Q$ and $\gamma_I$ are positive characteristic constants of the DPMZM device.

15. The DPMZM device of claim 13, wherein the calculation unit carries out an iterative solution of the two coupled non-linear equations, including at least two iterations of the iterative solution.

16. The DPMZM device of claim 13, wherein the calculation unit is configured to solve the following equations:

$$V_I = \frac{2V_\pi}{\pi} a\sin(P_1(y_I y_Q))$$

$$V_Q = \frac{2V_\pi}{\pi} a\sin(P_2(y_I, y_Q))$$

wherein $P_1(y_I, y_Q)$ and $P_2(y_I, y_Q)$ are polynomials of $y_I, y_Q$,
wherein $P_1(y_I, y_Q)$ is a first-order polynomial in $y_I$ and a at least a second-order polynomial in $y_Q$, and
wherein $P_2(y_I, y_Q)$ is preferably a first order polynomial in $y_Q$ and a at least a second-order polynomial in $y_I$.

17. The DPMZM device of claim 1, wherein the calculation unit comprises a look-up table of relating to a function a sin(x), and a look-up table relating to at least one of:
a function cos(x), and
cos(a sin(x)).

18. A method for generating a modulated optical signal using a dual parallel Mach-Zehnder-modulator (DPMZM) comprising a first inner Mach-Zehnder-modulator (MZM) and a second inner MZM arranged parallel to the first inner MZM, the first inner MZM operable to generate an in-phase component $E_I$ of the modulated optical signal in response to a first driving voltage $V_I$, the first driving voltage $V_I$ comprising at least a first AC component, and the second inner MZM operable to generate a quadrature component $E_Q$ of the modulated optical signal in response to a second driving voltage $V_Q$, the second driving voltage $V_Q$ comprising at least a second AC component, the method comprising the following steps:
receiving an in-phase component $y_I$ and a quadrature component $y_Q$ of a base-band signal,
calculating at least the first AC component of the first driving voltage $V_I$ as a function of both the in-phase component $y_I$ and the quadrature component $y_Q$ of the base-band signal,
calculating at least the second AC component of the second driving voltage $V_Q$ as a function of both the in-phase component $y_I$ and the quadrature component $y_Q$ of the base-band signal,
applying the first driving voltage $V_I$ to the first inner MZM for generating the in-phase component $E_I$ of the modulated optical signal and applying the second driving voltage $V_Q$ to the second inner MZM for generating the quadrature component $E_Q$ of the modulated optical signal.

19. The method of claim 18, wherein the calculation step employs at least one model parameter relating to a finite inner extinction ratio of at least one of the first inner MZM and the second inner MZM.

20. The method of claim 19, further comprising the steps of
receiving a quality indicator relating to a quality of an optical signal received by a receiver, and
modifying, in response to the received quality indicator, the at least one model parameter to improve a quality of the modulated optical signal generated using the DPMZM.

21. The method of claim 20, wherein the quality indicator relates at least in part to at least one of:
a bit-error rate related to the optical signal received by the receiver, and
an estimate of a bit-error-rate related to the optical signal received by the receiver.

22. The method of claim 20, wherein the quality indicator relates at least in part to at least one of:
a power of a residual carrier, and
an estimate of a power of a residual carrier.

23. The method of claim 20, wherein the quality indicator relates at least in part to a mean square error between a target transmit signal and an actual transmit signal.

24. The method of one of claim 18, wherein
the DPMZM further comprises an AC-coupling for coupling at least a portion of the first driving voltage $V_I$ to the first inner MZM and at least a portion of the second driving voltage $V_Q$ to the second inner MZM, and
wherein the method further comprises a step of applying a first bias component to the first inner MZM and a second bias component to the second inner MZM for generating the modulated optical signal.

25. The method of claim 24, wherein the first bias component corresponds to a first DC component of the first driving voltage $V_I$, and the second bias component corresponds to a second DC component of the second driving voltage $V_Q$.

26. The method of claim 24, wherein the method further comprises a step of adjusting, at least one of the first bias component and the second bias component in response to at least one of:
an error-indicating signal communicated by a far-end receiver, and
a quality indicator relating to a quality of an optical signal received by a far-end receiver.

27. The method of one of claim 18, wherein the calculation step comprises solving two coupled non-linear equations relating the in-phase component $y_I$ and the quadrature component $y_Q$ of the base-band signal to the first driving voltage $V_I$ and the second driving voltage $V_Q$.

28. The method of claim 27, wherein the two coupled non-linear equations are represented as follows:

$$y_I = \sin\left(\frac{\pi}{2} \cdot \frac{V_I}{V_\pi}\right) + \gamma_Q \cdot \cos\left(\frac{\pi}{2} \cdot \frac{V_Q}{V_\pi}\right)$$

$$y_Q = \sin\left(\frac{\pi}{2} \cdot \frac{V_Q}{V_\pi}\right) - \gamma_I \cdot \cos\left(\frac{\pi}{2} \cdot \frac{V_I}{V_\pi}\right)$$

wherein $V\pi$, $\gamma_Q$ and $\gamma_I$ are positive characteristic constants of the DPMZM device.

29. The method of claim 28, wherein the calculation step comprises an iterative solution of the two coupled non-linear equations, including at least two iterations of the iterative solution.

30. The method of claim 18, wherein at least the first AC component of the first driving voltage $V_I$ and at least the second AC component of the second driving voltage $V_Q$ are calculated to mitigate an adverse effect of I-Q cross talk introduced by at least one non-ideal characteristic of the DPMZM.

31. A dual parallel Mach-Zehnder-modulator (DPMZM) device for generating a modulated optical signal, comprising:
a first inner Mach-Zehnder-modulator (MZM) operable to generate an in-phase component $E_I$ of the modulated optical signal in response to a first driving voltage $V_I$, the first driving voltage $V_I$ comprising at least a first AC component;
a second inner MZM operable to generate a quadrature component $E_Q$ of the modulated optical signal in response to a second driving voltage $V_Q$, the second driving voltage $V_Q$ comprising at least a second AC component; and a calculation unit comprising at least one electrical component, the calculation unit operable to:

determine at least the first AC component of the first driving voltage $V_I$ as a function of both the in-phase component $y_I$ and the quadrature component $y_Q$ of a base-band signal, and determine at least the second AC component of the second driving voltage $V_Q$ as a function of both the in-phase component $y_I$ and the quadrature component $y_Q$ of the base-band signal.

32. The DPMZM device of claim 31, wherein at least the first AC component of the first driving voltage $V_I$ and at least the second AC component of the second driving voltage $V_Q$ are pre-distorted.

33. The DPMZM device of claim 32, wherein at least the first AC component of the first driving voltage $V_I$ and at least the second AC component of the second driving voltage $V_Q$ are determined based on at least one model accessible to the calculation unit.

34. The DPMZM device of claim 31, wherein the calculation unit is further operable to determine at least the first AC component of the first driving voltage $V_I$ and at least the second AC component of the second driving voltage $V_Q$ to mitigate an adverse effect of I-Q cross talk introduced by at least one non-ideal characteristic of the DPMZM device.

35. The DPMZM device of claim 34, wherein at least the first AC component of the first driving voltage $V_I$ and at least the second AC component of the second driving voltage $V_Q$ are determined based on at least one model accessible to the calculation unit.

* * * * *